United States Patent [19]

Lohrberg et al.

[11] 4,230,569
[45] Oct. 28, 1980

[54] METHOD AND APPARATUS FOR SUPPLYING DISSOLVED CHEMICALS INTO WATER

[75] Inventors: Karl Lohrberg; Rainer Pfohl, both of Heusenstamm; Jürgen Schubert, Obererlenbach; Martin Gritschke, Karben, Jochen Freytag, Usingen all of Fed. Rep. of Germany

[73] Assignee: Metallgesellschaft Aktiengesellschaft, Frankfurt am Main, Fed. Rep. of Germany

[21] Appl. No.: 28,026

[22] Filed: Apr. 6, 1979

[30] Foreign Application Priority Data

Apr. 17, 1978 [DE] Fed. Rep. of Germany ....... 2816522

[51] Int. Cl.² ................................................. C02B 3/08
[52] U.S. Cl. ....................................... 210/754; 210/219; 210/220; 210/764; 422/37; 422/225; 422/292; 261/121 R; 137/896; 366/173
[58] Field of Search ............... 210/62, 64, 169, 199, 210/205, 206, 219, 242 R, 220; 261/120, 121 R, 124, 81; 366/167, 173, 177; 137/604; 422/37, 292, 225, 231

[56] References Cited

U.S. PATENT DOCUMENTS

| 1,579,917 | 4/1926 | Deming | 210/242 R |
|---|---|---|---|
| 2,857,202 | 10/1958 | Snyder | 137/604 |
| 2,919,027 | 12/1957 | Blumenfeld | 210/242 R |
| 3,108,298 | 10/1963 | Gelinas | 210/242 R |
| 3,133,558 | 5/1964 | Fajans | 137/604 |
| 3,318,098 | 5/1967 | Hoddinott | 261/124 |
| 3,613,723 | 10/1971 | Witt | 137/604 |
| 3,684,460 | 8/1972 | Arneson | 210/62 |
| 3,749,244 | 7/1973 | Jannuzzi | 210/206 |
| 3,758,276 | 9/1973 | Bond et al. | 210/242 R |
| 3,807,434 | 4/1974 | Rasmussen | 137/604 |

FOREIGN PATENT DOCUMENTS

1610387 4/1971 Fed. Rep. of Germany.
1816526 5/1974 Fed. Rep. of Germany.

OTHER PUBLICATIONS

Betz Handbook of Industrial Water Conditioning 7th Edition, 1976, Trevose, Pa., 27.

Primary Examiner—Ernest G. Therkorn
Attorney, Agent, or Firm—Sprung, Felfe, Horn, Lynch & Kramer

[57] ABSTRACT

A process for supplying a liquid such as a liquid containing chlorine to a stream of another liquid such as a cooling water stream is disclosed wherein the stream to which the liquid is fed is passed in a generally horizontally disposed conduit and the liquid being fed thereto is introduced into a stationary manifold disposed thereabove which manifold is in fluid communication with the plurality of vertically disposed discharge hoses of differing lengths each of which has an outlet opening, the oulet opening is being substantially evenly distributed throughout the cross-section of the conduit. Also disclosed is an apparatus for effecting such a process.

5 Claims, 1 Drawing Figure

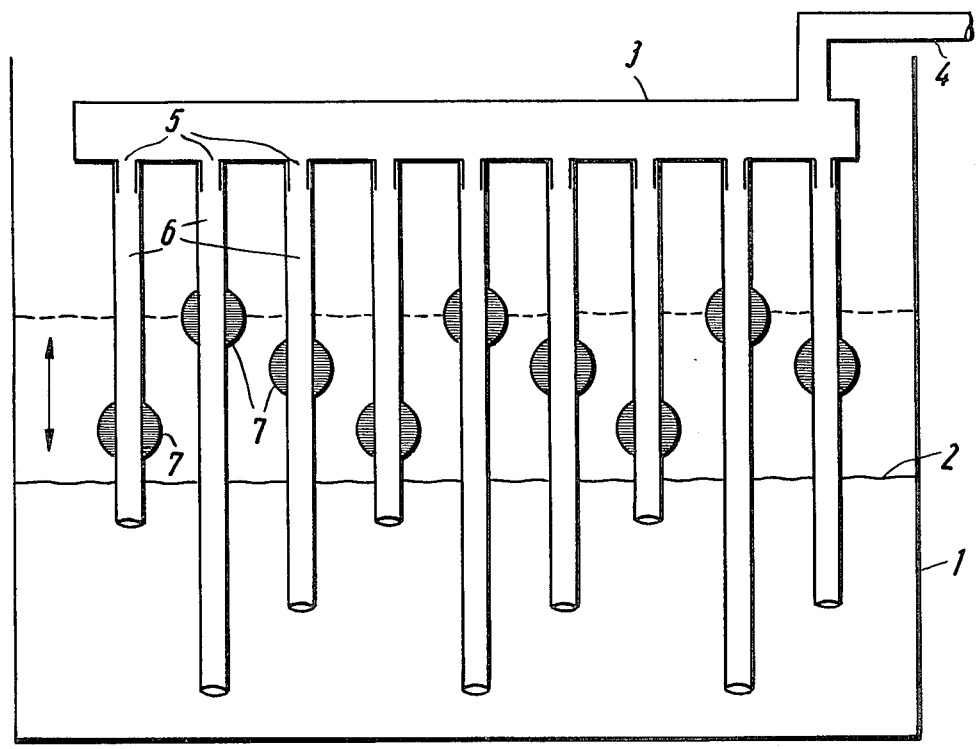

METHOD AND APPARATUS FOR SUPPLYING DISSOLVED CHEMICALS INTO WATER

BACKGROUND OF THE INVENTION

1. Field of the Invention

This invention relates to a process and apparatus for supplying dissolved chemicals into horizontally flowing streams such as horizontally flowing water streams wherein the apparatus comprises a manifold and a plurality of discharge conduits connected thereto which conduits extend downwardly from the manifold.

2. Discussion of the Prior Art

In numerous processes of treating water, an addition of dissolved chemicals is required. Such chemicals may be used to precipitate or flocculate impurities or to disinfect water.

In such operations it is essential to avoid a supply at a discrete point because this would necessitate a subsequent mixing, e.g., by mechnical means, and to ensure a maximum dispersion of the chemicals as they enter the water. When water is treated in a separate container, it is relatively simple to effect a uniform dispersion of the chemicals, e.g., in that the feed pipes for the chemicals open in a large number of chambers, which are defined by superposed horizontal plates and radial partitons (Printed German Application No. 18 16 526). A similar arrangement is constituted by the manifold disclosed in Opened German Specification No. 16 10 387. The manifold is used to spray fluids under pressure into a liquid to be treated. The orifices of the manifold are covered by prestressed elastic hoses, which are forced against the orifices in a closing sense by the static pressure of the sewage and are lifted by the fluid being sprayed so as to provide discharge passages.

Difficulties arise when dissolved chemicals are to be supplied to horizontally flowing water, for instance, when streams of sea water or river water are to be chlorinated for use as cooling water, e.g., for power plants. In such case, chlorine-containing chemicals which contain 2 to 8 grams available chlorine per liter must be distributed in the cooling water so that a concentration of about 2 to 10 ppm results. This requires a dilution of about 1:4000.

It is an object of this invention to eliminate the previously encountered disadvantages, particularly those mentioned above, and to provide an apparatus which is simple in structure and by which dissolved chemicals can be distributed to a high degree in the water which is to be treated.

SUMMARY OF THE INVENTION

The foregoing objects are accomplished, in accordance with this invention, which provides an apparatus for supplying dissolved chemicals into horizontally flowing liquid which apparatus comprises a horizontally disposed conduit through which said liquid passes, the stationary manifold disposed above the level of flowing liquid which manifold is in liquid fluid communication with a plurality of vertically disposed discharge hoses of differing lengths, each of which has an outlet opening disposed below the level of said flowing liquid, said outlet openings being substantially evenly distributed throughout the cross-section of said flowing liquid.

This invention further relates to a process for supplying a liquid to a generally horizontally flowing stream which process comprises passing said stream along a generally horizontal path in a generally horizontally disposed conduit, feeding said liquid to be fed to said stream into a stationary manifold disposed above said stream which manifold is in fluid communication with a plurality of vertically disposed discharge hoses of differing lengths, each of which has an outlet opening disposed below the level of the flowing stream, said outlet openings being substantially evenly distributed throughout the cross-section of said flowing stream.

By the apparatus and process of the invention dissolved chemicals can be readily introduced into generally horizontally flowing streams particularly aqueous streams with a particularly high degree of even distribution throughout the streams owing to the disposition of the discharge hoses which promote the distribution of the chemicals to be introduced into the horizontally flowing stream by oscillation.

Where horizontally flowing water is to be treated by means of the apparatus according to the invention, the surface level of the water may often change, e.g., as a result of dry or rainy periods. To ensure a maximum distribution of the dissolved chemicals also in such cases, a preferred feature of the invention resides in that floats are provided on the discharge hoses on different levels and ensure that the outlet openings of the discharge hoses are raised as the surface level of the flowing water rises and the outlet openings are thus adapted to the changed cross-section of flow.

The selection of the materials used to make the manifold and the discharge hoses will depend on the intended use of the apparatus according to the invention and on the nature of the chemical to be supplied. The manifold and discharge hoses are preferably made from chemical resisting materials, such as polytetrafluoroethylene, polypropylene or polyvinylchloride.

A preferred use of the apparatus according to the invention resides in the supply of liquids which contain available chlorine into cooling water streams. Owing to the high speed and the high degree of distribution, the coarse and fine rakes required for the protection of pumps, coolers etc., as well as sieves used to retain floating matter may be provided on the downstream side of the apparatus according to the invention. Compared to the provision of such protective means on the upstream side of the supply apparatus, i.e., in the water which has not yet been chlorinated, their arrangement on the downstream side affords the advantage that a growth of organism, such as shells etc. on the protective means will be avoided. Because the available chlorine has previously been thoroughly distributed throughout the liquid stream, the protective means may be made from ordinary steel rather than from titanium which is otherwise required although it is expensive.

BRIEF DESCRIPTION OF DRAWINGS

The invention can be more readily understood and appreciated when reference is made to the accompanying drawing which is a transverse sectional view of a generally horizontally disposed conduit containing a flowing stream whose level is represented by reference numeral 2. Above the stream and across the same in the transverse section is a manifold 3 connected to plastic hoses 6 by use of connection pipes 5.

DESCRIPTION OF SPECIFIC EMBODIMENTS

Referring to the appended drawing, a concrete-lined duct 1 is used to supply cooling water to a power plant.

The surface level of the water is indicated at 2 and may rise up to the dotted line. A manifold 3 is installed in the duct 1 and is supplied through a conduit 4 with a hypochlorite solution having a concentration of, e.g., 2 grams available chlorine per liter. The manifold 3 is provided with connection pipes 5, on which plastic hoses 6 are fitted, which differ in length so that the outlet openings of adjacent hoses are disposed at different depths and the outlet openings are regularly distributed throughout the cross-section of the water stream. The hoses 6 which can be made of a flexible material, are preferably provided with floats 7, which become effective at different times during a rise of the water level and which cause the outlet openings to be raised an amount corresponding to the increased water level whereby the outlet openings remain fixed the same distance below the water (or other fluids) level. This ensures that the outlet openings remain virtually regularly distributed throughout the cross-section of flow.

What is claimed is:

1. An apparatus for supplying dissolved chemicals into a horizontally flowing liquid which comprises a horizontally disposed conduit through which said liquid passes, a stationary, substantially horizontal manifold disposed above the level of said flowing liquid which manifold is in fluid communication with a plurality of vertically disposed discharge hoses of differing lengths, each of which has an outlet opening disposed below the level of said flowing liquid, said outlet openings being substantially evenly distributed throughout the cross-section of said flowing liquid.

2. An apparatus according to claim 1 wherein each of said discharge hoses has attached thereto a float to ensure a substantially uniform distribution of the outlet openings throughout the cross-section of flow in case of fluctuations of the surface level of the flowing liquid.

3. An apparatus according to claim 1 wherein said discharge hoses consist essentially of a chemical resisting material.

4. An apparatus according to claim 3 wherein said material is selected from the group consisting of polytetrafluoroethylene, polypropylene and polyvinylchloride.

5. A process for supplying a liquid containing available chlorine to a cooling water stream which comprises passing said stream along a generally horizontal path in a generally horizontally disposed conduit feeding said liquid containing available chlorine into a stationary, substantially horizontal manifold disposed above said stream which manifold is in fluid communication with a plurality of vertically disposed discharge hoses of differing lengths each of which has an outlet opening disposed below the level of the cooling water stream said outlet openings being substantially evenly distributed throughout the cross-section of said water stream.

* * * * *